US005548491A

United States Patent [19]

Karpen

[11] Patent Number: 5,548,491

[45] Date of Patent: Aug. 20, 1996

[54] COLOR CORRECTED MOTOR VEHICLE HEADLIGHT

[76] Inventor: Daniel N. Karpen, 3 Harbor Hill Dr., Huntington, N.Y. 11743

[21] Appl. No.: 368,763

[22] Filed: Jan. 4, 1995

Related U.S. Application Data

[63] Continuation-in-part of Ser. No. 160,693, Dec. 1, 1993, abandoned.

[51] Int. Cl.[6] .......... B60Q 1/04

[52] U.S. Cl. .......... 362/61; 362/293; 362/19; 313/112

[58] Field of Search .......... 362/61, 293, 19, 362/80, 255, 310, 321, 307, 351; 313/112, 113; 359/884

[56] References Cited

U.S. PATENT DOCUMENTS

| | | | |
|---|---|---|---|
| 2,219,122 | 10/1940 | Weidert . | |
| 2,490,539 | 12/1949 | Oberg | 362/293 X |
| 4,315,186 | 2/1982 | Hirano et al. | 313/113 X |
| 4,386,292 | 5/1983 | Rothwell et al. | 362/293 X |
| 4,395,653 | 7/1983 | Graff | 362/112 |
| 4,814,956 | 3/1989 | Kano | 362/293 |
| 4,951,178 | 8/1990 | Shirai et al. | 362/61 |
| 5,180,224 | 1/1993 | Svehaug | 362/293 X |

FOREIGN PATENT DOCUMENTS 762678 of 1956 United Kingdom .

OTHER PUBLICATIONS

David R. Lide, editor, Handbook of Chemistry and Physics; 73rd edition, CRC Press, Ann Arbor, MI 1992 pp. 4–18, 4–77.

Weeks, Mary Elvira; Discovery of the Elements; Journal of Chemical Education; 6th edition; 1960 p.552, p.701, pp. 704, 713–714.

Moeller, Therald; The Chemistry of the Lanthanides; Reinhold Publishing Co., New York, NY 1963 pp. 1–4.

Hufner, S. "Optical Spectroscopy at Lathanides in Crystalline Matrix" in Systematics and the Properties of the Lanthanides; edited by Shyama P. Sinha; 1983 ; 313, 373.

Weyl, Woldemar A; Coloured Glasses; Dawson's of Pall Mall; London, 1959 pp. 219, 220, 77–78, 221, 226.

Weidert, F. "Das Absorptions Spectrum Von Didymglasern bei verschiendenartiger Zusammensetzung des Grundglases"; Zeithschritt f. Wissphotog; 1921–1922 vol. 21 pp. 254–264.

Weyl, Wolderman A. and Evelyn Chostner Marboe; The Constitution of Glasses vol. 1, Interscience Publishers, a div. of John Wiley, NY, 1962, p.315.

Bouma, P. J. "The Colour Reproduction of Incandescent Lamps and 'Philiphane Glass'"; Philips Technical Review; 1938, vol.3, pp.27–29.

(List continued on next page.)

*Primary Examiner*—Denise L. Gromada
*Assistant Examiner*—Thomas M. Sember
*Attorney, Agent, or Firm*—Alfred M. Walker

[57] ABSTRACT

A lamp, suitable for use as a headlight for land, water and aircraft and motor vehicles in particular. The lamp includes glass containing Neodymium Oxide, a rare earth compound. The Neodymium Oxide filters out the naturally occurring yellow light produced by a hot incandescent filament, thereby producing a color-corrected light. Yellow light contributes to a lack of contrast. Improvement in contrast permits, for example, a motor vehicle driver to better discriminate the contrast of objects when there is no daylight and the only illumination is artificial. For drivers, in particular, elimination of the excessive yellow light lessens eyestrain currently resulting from light emitted by the conventional headlights of oncoming vehicles during hours of darkness. Lamps of increased wattage than present can be used without increasing eyestrain from opposing motor vehicles, which in turn leads to better contrast, and thus improved night time visual acuity, resulting from the increased amount of light for a driver of a motor vehicle equipped with the herein disclosed color corrected headlight.

13 Claims, 4 Drawing Sheets

OTHER PUBLICATIONS

Dannmeyer F., "Das Neophanglas als nautisches Hilfsmittel bei unklarer Sicht, Die Glashutte"; 1934, No.4, pp.49–50. (also including translation of above article).

Gouras, P. and E. Zrenner, "Color Vision", A Review from a Neurophysicalogical Perspective; in progress in Sensory Physiology 1; Springer–Verlag, Berlin–Meidelberg, NY 1981.

Faye, Eleanor "A New Light Source" The New York Association for the Blind, Ny, NY undated, one page.

Neodymlite Report OY Airam AB Finland.

Cohen, Jay M. and Bruce Rosenthal, "An Evaluation of an Incandescent Neodymium Light Source on Near Point Performance of a Low Vision Population", Journal of Visual Rehabilitation, vol.2, No.4, 1988, pp.15–21.

Disclosure Document No. 315,392, Aug. 18, 1992.

Ctyroky, V. "Vber mid Nd2 03 and V2 03 gefarble Glaser. Glastechnischen Berichte", Jan. 1940, pp.1–7.

Rosenhauer, M., Weidert, F., Ueber die spekrale Absorption von Neodymglasern, Glastechnische Berichte, Feb. 1938, pp.51–57.

Hansa, German Steamer Navigation Magazine, LXX, Dec. 1933.

COLOR CORRECTED MOTOR VEHICLE HEADLIGHT

This application is a continuation-in-part of application Ser. No. 08/160,693 filed Dec. 1, 1993 now abandoned Jan. 4, 1995.

FIELD OF THE INVENTION

The invention relates to the development of a new motor vehicle headlight, and in particular to a new headlight that will be capable of providing color corrected light that will be capable of improved color rendition and better contrast at the levels of illumination necessary to see while driving at night, and to eliminate much of the discomfort experienced by drivers seeing the headlights of cars coming in the opposite direction. It can be used on new cars and for older vehicles as a replacement item for the automotive after-market.

DOCUMENT DISCLOSURE PROGRAM

The application for patent is based on a disclosure filed on Aug. 18, 1992, as Disclosure Document No. 315,392, under the Document Disclosure Program.

BACKGROUND AND THEORY OF THE INVENTION

It has long been recognized that visual discomfort from the light from vehicles coming from the opposite direction is a major problem that has been unsolved to this time.

One such proposed solution was to install polarizers on automobile headlights. The concepts behind such technology has been summarized by Shurcliff (also see MARKS, British Pat. No. 762,678, (1956)). Difficulties involving bulk, fragility, a tendency to become cloudy, polarization defect, and manufacturing costs, prevented the implementation of this technology.

Hirano (U.S. Pat. No. 4,315,186) discloses a reflective lamp with a Neodymium Oxide doped front lens section fused to a reflective mirror section. However, Hirano restricts the amount of Neodymium Oxide in the front lens section to the range of 0.5 to 5.0 percent by weight. At an amount of Neodymium Oxide above 5 percent, the difference in the thermal expansion coefficient between the resultant glass material and that constituting the reflective mirror section and containing no Neodymium Oxide becomes too great, so that it becomes difficult to fuse the front lens section to the reflective mirror section.

What the present invention does, and what the prior art failed to do, is to incorporate into the glass used for the entire glass bulb, including any glass with reflective surfaces, with Neodymium Oxide doped glass with at least 5 percent Neodymium Oxide doping by weight. to reduce the amount of yellow light emitted by the headlight, since yellow light is the source of most visual discomfort to a vehicle driver.

The approach of the present invention to the problem of visual discomfort from headlights from cars coming from the opposite direction is to add Neodymium Oxide, a rare earth oxide, to the glass of the headlight lamp. For example, the generally convex, transparent outer glass envelope prism lens of the headlight lamp includes Neodymium Oxide. According to the present invention, a sealed beam headlight has a generally concave inner reflector, which reflects light from a hot incandescent filament, through the generally convex, transparent outer glass envelope prism lens, in an outwardly expanding conical light beam, which is reflected off of objects at night, and in bad weather, back to the automobile driver, by the addition of Neodymium Oxide to the convex glass lens of the headlight. A concentrated light beam is transmitted in the path of the motor vehicle with a unique spectral energy distribution, which promotes night vision and visual acuity in darkness, by emphasizing the contrast-producing red and green light waves, and, at the same time, reducing the discomfort producing yellow light waves of the visible light spectrum of the concentrated reflected light beams from motor vehicles from the opposite direction.

To explain the importance of the present invention, a discussion of its Neodymium Oxide component is as follows:

Neodymium is a rare earth element, having an atomic number of 60 and an atomic weight of 144.24. It combines with oxygen to form Neodymium Oxide, $Nd_2O_3$, having a molecular weight of 336.48.[1].

The elucidation of the rare earths in elemental form took the better part of the nineteenth century, and the properties of Neodymium that are important to the lighting art in this patent application were known even before neodymium was prepared in metallic form. In 1803, Klaproth discovered the mineral ceria. It was also found about the same time by Berzelium and William Hisinger.[2] This mineral proved to be a mixture of various rare earth oxides. In 1814, Hisinger and Berzelius isolated Cerium Oxide from the ceria earth.[3] In 1839, Moslander found the rare earth lanthana in the ceria.[4] In 1841, Moslander treated lanthana with dilute nitric acid, and extracted from it a new rose colored oxide which he called didymium, because as he said, it seemed to be "an inseparable twin brother of lanthanum".[5]

It was believed that didymium was a mixture of elements. The separation proved difficult. In 1882, Professor Bobuslav Brauner at the University of Prague examined some of his didymium fractions with the spectroscope and found a group of absorption band in the blue region ($\lambda$=449–443 nanometers) and another in the yellow ($\lambda$=590–568 nanometers).[6] In 1885, Welsbach separated didymium into two earths, praseodymia and neodymia.[7] The neodymia has the absorption bands in the yellow region. The neodymia earth is Neodymium Oxide.

The spectra of rare earths became of great interest to a number of investigators. The most impressive feature about the spectra of rare earth ions in ionic crystals is the sharpness of many lines in their absorption and emission spectra. As early as 1908, Becquerel realized that in many cases these lines can be as narrow as those commonly observed in the spectra of free atoms of free molecules.[8]

However, many solids that are of practical use today are amorphous or glassy rather than crystalline. That means that in the immediate environment of like ions in such substances is similar, but that there is no long range order in the sample. Rare earth ions can be easily incorporated into many glasses. It was noted quite early that in glasses, as might be expected, the most prominent feature of the rare earth crystal spectra, the extreme sharpness of the optical lines, vanishes.

From a simplified point of view, a glass is a supercooled liquid. It can therefore be assumed that the spectra of rare earth ions in glasses will be similar to those of rare earth ions in liquids. The spectra in liquids show a "crystal field splitting", although with very wide lines. This is an indication that the rare earth ions in a liquid are surrounded by a near neighbor shell of ligands—similar to the configuration found in a solid and the same for every rare earth ion, and that the uncorrelated structure is only beyond the near neighbor shell. If the near neighbor coordination in a liquid is the same as in a solid, one can understand the similarity in the magnitude of the crystal field splitting of the crystal and the solution. In glasses the rare earth ions are incorporated as oxides. From the reasoning just cited one can expect that rare earth spectra in glasses to be similar to those of the stable oxide modification of the particular rare earth ion; this expectation is verified by experimental findings.[9]

The absorption of an ion may undergo a fundamental change when placed in different surroundings. A great variety of colors which can be obtained with divalent copper, cobalt, or nickel ions have been attributed to the differences in co-ordination numbers and the nature of the surrounding atomic groups. The change of an ionic bond into a covalent bond produces a completely different absorption spectra. The close interdependence of light absorption and chemical change is not surprising when it is realized that the electrons which are responsible for the visible absorption are also responsible for the chemical interactions and the formation of compounds.

The case, however, is different with the rare-earth compounds. Their colors depend on the transitions taking place in an inner, well protected, electronic shell, whereas the chemical forces, as in other elements, are restricted to deformations and exchanges of electrons within the outer electronic shells. Consequently, the color of Neodymium compounds remains practically independent of the nature of the atoms in which the element is linked. The hydrated salts are amethyst colored, just as the water free salts, the ammoniates, the hydroxide, or the oxide. Chemical changes affect color only to a minor extent.[10]

A number of studies of Neodymium Oxide containing glasses have been conducted to examine the absorption spectra. Weidert conducted a systematic study in 1922. Samples of pure Neodymium Oxide glasses were made available for the first time, relatively free of contamination from impurities such as praeseodymium.[11] Spectra were published showing the absorption of yellow light in a broad band from 568 to 590 nanometers.[12].

According to Rosenhauer and Weidert, the absorption spectra of the $Nd^{+3}$ ion in glasses signals any change of the structure which affects the stability of the glassy state. Composition changes which increase the tendency of a glass to divitrify also blur the normally sharp absorption bands of the $Nd^{+3}$ ions. The absorption indicators can be used therefore for studying the compatibility of oxide systems.[13] In their studies, the base glasses differed in their alkalis. The smaller the atomic radius of the alkali the more diffuse is the absorption band. The fine structure of the rubidium glass gradually disappears when this large alkali is replaced by the smaller potassium, sodium, or lithium ion. The corresponding lithium glass could be obtained only by rapid cooling; otherwise crystallization took place. Thus, there seems to be a general connection between the tendency of a glass to divitrify and its absorption spectrum. In all the glasses which crystallize readily Neodymium causes only a somewhat diffuse absorption spectrum.[14] Regardless of the alkali base of the underlying glass, the absorption of yellow light between 568 and 590 nanometers is seen in all samples of glass (see FIG. 1).[15]

Glasses containing Neodymium Oxide experience "dichroism". In artificial light, the Neodymium Oxide glass appears as a brilliant red. The color sensation not only varies with the type of illumination, but also with the thickness of the glass layer. In thin layers or with low concentrations of Neodymium Oxide these glasses are blue, in thick layers or with high concentrations, red.[16]

V. Ctyroky made a study of the dichroism of glasses containing various combinations of Neodymium and Vanadium. It was his attempt to calculate the thickness of the glass and the concentration of the colorants which product the maximum dichroism. The color play of these glasses is caused by the Neodymium Oxide, for the Vanadium Oxide produces a green color which serves only to modify the original blue-red dichroism of the rare earth. The absorption of the yellow light between 568 and 590 nanometers is so intense that even a faintly colored Neodymium Oxide glass absorbs yellow light almost completely. Thus the transmitted spectrum is divided into two parts, a blue and a red one. The color sensation which such a glass produces depends on the intensity distribution of the light source. In daylight the blue part predominates; in artificial light (incandescent), which is relatively poor in short-wave radiation, the red predominates.[17]

The characteristic absorption of a Neodymium Oxide glass, especially its narrow intense band in the yellow part of the spectrum, affects color vision in a unique way. Looking through such a glass at a landscape or a garden in bloom, the red and green hues are strongly accenuated; especially do all colors containing red stand out very clearly.[18] This improvement is very important at the low levels of illumination provided at great distances by a motor vehicle headlight. For example, a red stop sign will appear redder.

Another interesting feature when looking through a Neodymium Oxide glass is the distinction between the green of vegetation and a similar green hue produced by the blending of inorganic pigments. Whereas the hues of both greens may be the same, the reflection spectra are fundamentally different in respect of their intensity distribution; for the chlorophyll of plants possesses a spectrum rich in fine structure.[19] Such an effect is very important for vision along highways, where most of the road signs along Interstate or similar class roads are green. Thus, during the growing season, motorists would find it easier to see road signs at greater distances against green vegetation.

Bouma explains how the electric light (incandescent lamp) can be improved by the introduction of a colored envelope using a glass with Neodymium Oxide, known as "Neophane" glass (for purposes of clarity, an envelope refers to the outer shell of a lamp bulb). It is clear that large portions of the spectrum must not be weakened to any extent. Otherwise, there would be too great a decrease in the efficiency. Only an improvement of the color which can be obtained with a relatively slight loss of light can be considered.[20]

The only possibility thus consists of the absorption of one or more relatively small regions of the spectrum. The pertinent question is what colors may be considered in this connection? In general, absorption of a given color is accompanied by the following two objections:

1. An object which reflects almost exclusively this color appears too dark.
2. Objects which exhibit the color under consideration in a less saturated form will appear still less saturated.

The first objection holds primarily for the colors at the extremities of the spectrum, thus for red and blue. Very saturated red, for example, can only occur when a material reflects practically exclusively red and orange. The same is true of blue.

For yellow, the situation is different. Highly saturated yellow occurs in nature as a rule, not only because a narrow region of the spectrum is reflected, but because red and green as well as yellow are fairly well reflected, and only blue and violet are absorbed to a large extent.

The second objection also holds particularly at the extremities of the spectrum: the blue, which is reproduced in electric light is a much less saturated form than in daylight, may certainly not be made still duller. The saturation of the red may also not be decreased too much, since otherwise the reproduction of skin color would be made worse.

For the reasons mentioned above, the second objection is also of much less importance in the case of yellow.

Bouma surrounded an incandescent lamp with a bulb of the Neodymium Oxide containing Neophane glass, and compared the color rendition to an incandescent lamp surrounded by an ordinary opal glass bulb. His results indicated the majority of the colors became more saturated, a change which is to be desired, especially at relatively low levels of illumination. In particular, the blue, which upon changing from daylight to incandescent has become considerably less saturated is again reproduced in a more saturated form.

The orange is shifted toward the red: the shift in the direction yellow to red is in general experienced as an increased "warmth" of that color.

The green, which upon translation from daylight to incandescent light had become a somewhat dubious yellowgreen, goes back to green again under the influence of the Neophane glass.

Finally, Bouma notes that white and the very unsaturated colors are shifted in the direction of blueviolet. This may certainly not be considered an advantage since however the change is not very great, (less than ⅓ of the difference between incandescent light and daylight) and moreover since it lies almost in the same direction as the shift on transition from daylight to incandescent light, the shift is not disturbing.[21]

In summary, Bouma found that the use of the Neodymium Oxide containing Neophane glass has the advantage of reproducing most colors in a more saturated form and of making the orange-yellow warmer. Various disadvantages of incandescent light, such as the faded appearance of blue and the shift of green towards yellow-green, are partially overcome. The most important advantages of the incandescent light such as the high saturation of the orange and of the colors in its neighborhood, the greater intensity of red, are retained.

Dannmeyer made an investigation of Neodymium Oxide containing Neophane glass as a vision aide in bad weather for navigational purposes.[22] His experiences parallel those of a motorist on a foggy or rainy night. If one looks at a spectrum through this glass, one will notice that yellow is eliminated, but red and green appear much clearer. If one looks at a landscape, even in murky weather, one will see wonderful lustrous colors, emphasizing everything red and even green. But there is another special effect: the discomforting blinding effect created principally by yellow disappears at the same time. If one looks at the branches of a bare tree against a bright sky, one won't be able to see the ends. They disappear in the general glaze. If, however, one looks through the Neodymium Oxide glass—or as it is now technically called, Neophane glass—even the slightest differences are emphasized. All blinding effects against the clear sky or the sun, disappear and the elements of the optical picture appear more sharply even when looking toward the sunset and twilight pictures have more contrast.

As further noted in Dannmeyer,[23] the effects of using the Neodymium Oxide containing Neophane glass was studied during the summer and fall on the Elbe River and in the North and Baltic Seas. It was shown that clear sighting made red and green as already mentioned, especially clear. External identification of a ship by the color of its smoke stack, bottom paint, ensign and other elements was made much easier. If the weather was hazy or misty, so that one could see the other ship only as a silhouette grey against grey, color differences could still be seen that could not have been recognized with unaided sight. But what was immensely important was that ships that in hazy weather seemed to be the same distance apart, were seen to be at varied distances from one another; both location and movement were much easier to differentiate.

It is well known that on the Elbe, at sunset, outgoing ships looking into the sunset have on occasion had optical difficulties caused by the blinding of the sun. Markers are difficult to distinguish, and even though ship pilots are exceedingly well informed, discerning an oncoming ship is sometimes exceedingly difficult.

According to Dannmeyer, Neodymium Oxide containing Neophane glass prevents all of these things from happening to the eye. Along the lower Elbe one is able to distinguish a lengthening of the coastline even in hazy weather, and thus seeing distances are actually extended by about a nautical mile. On the North Sea, it is possible to make out various vessels that would not have been discernible in the misty weather. The grey of the vessels appears darker than the surroundings through the eyeglasses. In the reflection of the sinking sun, in which the eye really could not distinguish objects, the vessels were clearly discernible through the Neodymium Oxide containing Neophane glass.[23]

The aforementioned studies of Neodymium Oxide containing glass in window and indoor light bulb applications can be applied to the previously undiscovered use of the present invention for vehicular headlights, for better vision during night driving.

According to the present invention, when the Neodymium Oxide glass is used in a motor vehicle headlight for night and bad weather driving, the discomforting undesirable yellow light is filtered out, making objects more clear with improved contrast and color rendition. In addition, the eyestrain caused by the intense yellow of the point sources of on-coming individual headlights coming from the opposite direction, is eliminated, ending once and for all the discomfort experienced from light from headlights coming from the opposite direction.

A physiological explanation of how the eye sees colors provides an explanation of the visual effectiveness of Neodymium Oxide lamps for vehicular headlights. The following explanation is provided by Gouras:[24]

There are three cone mechanisms in the human visual system, with peak sensitivities near 440 nanometers in the blue-violet, 540 nanometers in the green, and 610 nanometers in the orange These mechanisms are loosely called "blue" "green" and "red" processes in vision because they may be roughly thought of as being affected, respectively, by blue, green, and red light.

There are approximately 6 to 7 million green plus red cones per eye, and less than 1 million blue cones. The green and red cones contribute towards seeing fine detail and contrasts; the blue cones do not. The blue cones are thought to provide, mainly, the means of distinguishing between yellow and white appearing objects; the blue-cone mechanism is excited by blue light and inhibited by yellow light.

When mid-spectral (yellowish) images are in sharp focus on the retina, bluish wavelengths are out of focus. Low visual acuity is associated with the blue-cone mechanism, and high visual acuity with the green plus red cone mechanism. The term "yellowish images" does not necessarily imply any yellow content in the light, since green plus red yields the sensation of yellow.

The cones feed their signals into various kinds of cells in and beyond the retina. Strongly cone opponent cells are those cells that are excited by one color of light and inhibited by another. The "red-green contrast detectors" contribute heavily to both luminance and color contract, and also to the detection of differences between elements of a scene. They supply information on fine spatial detail.

The strongly cone-opponent cells (associated with the green and red cones) are turned off or on by green or red light, and are very unresponsive to yellow light. The redgreen contrast detector is totally inhibited by yellow light.[25]

Thus, a vehicular headlight with Neodymium Oxide containing glass appears to provide the maximal filtering effect of the discomforting yellow light in order to improve contrast, visual acuity and color recognition.

Two recent studies of the functioning of the eye for people of low vision are of interest. Neodymium Oxide type motor vehicle headlights will be of help not only to people who have normal vision, but also to people who may be visually impaired.

Faye reports that the visual impression in viewing colored objects is a vivid "true" color similar to the view in full sunlight.[26] In viewing high contrast acuity charts, contrast sensitivity chart tests (Vistech VCTS 6500), and reading material, there is an increased contrast between black and white, when incandescent light bulbs containing Neodymium Oxide are used indoors. White appears whiter and black blacker because of the decreased yellow emission of the Neodymium Oxide containing bulb.

To date, while no specific recommendations can be made, it appears that a history from visual impaired patients that they need sunlight for best reading (or can't read by artificial light), indicates a favorable response to the Neodymium Oxide containing light bulbs. Favorable responses have been elicited from patients with retinitis pigmentosa, optic atrophy, glaucoma with visual field defects, and diabetes with proliferative retinopathy who have undergone panretinal photocoagulation.

A study of low vision patients was conducted by Cohen and Rosenthal at the State University of New York School of Optometry in New York City.[27] Their study also found more accurate color rendering and an improvement in visual acuity, contrast, and a reduction of eye fatigue. Tests were conducted on 51 low vision patients using standard incandescent lamps and standard "A" type Neodymium Oxide lamps on the Vistech 6000 Contrast Test and high and low contrast acuity cards. Results showed a small, but statistically significant performance on all targets when using Neodymium Oxide bulbs. Subjective preference also favored the Neodymium Oxide bulbs in a 5 to 1 ratio when a preference was present. The patient population had such pathologies such as achromotopsia, albinism, cataracts, congenital cataracts with aphakia, cortical anoxia, diabetic retinopathy, optic atrophy, pathological myopia, primary nystagmus, retinitis pigmentosa, ROP, and SMD.

As a result, it is shown that the use of Neodymium Oxide containing incandescent light bulbs filter out unwanted excessive yellow light, thus favoring vision promoting redgreen contrast detectors, to improve visual contrast, visual acuity and better color recognition.

References

1. David R. Lide, editor; *Handbook of Chemistry and Physics*; 73rd edition; CRC Press; Ann Arbor, Mich.; 1992. p. 4–18, 4–77.
2. Weeks, Mary Elvira; *Discovery of the Elements*; Journal of Chemical Education; 6th Edition; 1960; p. 552.
3. Moeller, Therald; *The Chemistry of the Lanthanides*; Reinhold Publishing Company; New York, N.Y.; 1963; pp. 1–4.
4. Weeks; p. 701.
5. Ibid., p. 704.
6. Ibid., p. 713.
7. Ibid., p. 714.
8. Hufner, S.; "Optical Spectroscopy of Lanthanides in Crystalline Matrix"; in *Systematics and the Properties of the Lanthanides*; edited by Shyama P. Sinha; 1983; p. 313.
9. Ibid., p. 372.
10. Weyl, Woldemar A.; *Coloured Glasses*; Dawson's of Pall Mall; London; 1959; p. 220.
11. Ibid., p. 219.
12. Weidert, F.; "Das Absorptionsspektrum von Didymglasern bei verschiendenartiger Zusammensetzung des Grundglases"; Zeithschrift f. wiss. Photog.; 1921–22; Vol. 21; pp. 254–264.
13. Weyl, Woldemar A., and Evelyn Chostner Marboe; *The Constitution of Glasses*, Vol. 1; Interscience Publishers, a division of John Wiley & Sons; New York, N.Y.; 1962; p. 315.
14. Weyl, Coloured Glasses, p. 77.
15. Ibid., P. 78.
16. Ibid., P. 221.
17. Ibid., P. 221–222.
18. Ibid., P. 226
19. Ibid.
20. Bouma, P. J.; The Colour Reproduction of Incandescent Lamps and "Philiphane Glass"; Philips Technical Review; 1938; Vol. 3; pp. 27–29.
21. Ibid.
22. Dannmeyer, F.; "Das Neophanglas als nautisches Hilfsmittel bei unklarer Sicht"; Die Glashutte; 1934; Number 4; pp. 49–50.
23. Ibid.
24. Gouras, P. and E. Zrenner; "Color Vision: A Review from a Neurophysiological Perspective"; in *Progress in Sensory Physiology* 1; Springer-Verlag, Berlin-Heidelberg-New York, 1981.
25. Ibid.
26. Faye, Eleanor; "A New Light Source"; The New York Association for the Blind; New York, N.Y.; undated; one page.
27. Cohen, Jay M. and Bruce P. Rosenthal; "An Evaluation of an Incandescent Neodymium Light Source on Near Point Performance of a Low Light Vision Population"; Journal of Visual Rehabilitation; Vol. 2, No. 4; 1988; pp. 15–21.

SUMMARY OF THE INVENTION

While the present invention relates to all kinds of headlights for land and water vehicles, a vast improvement in visual performance, color rendition, and contrast of objects being illuminated is achieved by, for instance, a motor vehicle headlight containing Neodymium Oxide in the envelope glass bulb of the headlight.

The motor vehicle headlight as an example of the present invention, may be an incandescent lamp or a tungsten halogen light source. The glass bulb of an incandescent lamp is made of soda lime glass. For tungsten halogen lamps, which operate at higher temperatures, borosilicate or quartz glass is generally used for the bulb.

The transmittance of light through glass is governed by the Lambert-Beers Law, which relates the amount of light transmitted through a certain thickness of glass by an absorption coefficient:

$$Ln(T)=-AL$$

In the above equation, L is the thickness of the glass, A is the absorption coefficient, T is the percentage of light transmitted, and Ln represent the natural logarithm.

For the purposes of manufacturing Neodymium Oxide containing glasses, the Neodymium Oxide must be reasonably pure. Impurities can reduce transmittance of wavelengths other than the yellow, which is absorbed by the Neodymium Oxide.

The use of Neodymium Oxide as an ingredient in glass making, especially for the production of millions, if not tens of millions of lamps annually, requires a substantial amount of Neodymium Oxide of purity of 99.9 percent. The absorption properties of Neodymium Oxide containing glasses were know prior to World War II. However, the cost of producing reasonably pure Neodymium Oxide was quite high, because the chemical properties of the lanthanides are similar, and separation is difficult.

During World War II, while working on the separation of the fission products as part of the atomic bomb project, scientists developed the elution chromagraphic ion exchange method for separating the rare earth elements. A major breakthrough occurred in the 1950's when Frank H. Spedding and co-workers developed the band-displacement ion exchange method, which was capable of producing macro quantities of extremely pure individual elements. Within 10 years, liquid-liquid extraction methods were developed which provided even lower priced individual rare earth elements.

Thus, it is possible to manufacture Neodymium Oxide containing incandescent headlight lamps and tungsten halogen headlight lamps at a reasonable cost, that does not add significantly to the price of a new air, water or landcraft, or in particular an automobile, and the headlight lamps can be reasonably priced to compete in the vehicle aftermarket.

Neodymium Oxide containing glasses are commercially available for use in glass blowing. Two examples of glasses that are available that may be used for the purposes of the vehicular headlight of the present invention are described below. One glass, a mixed alkali zinc silicate crown glass that can be used for an incandescent type headlight, L6660, is manufactured by Schott Glass Technologies of Duryea, Pa. 18642. It has 4.0 percent Neodymium Oxide doping with an extinction coefficient of 8.1 $cm^{-1}$ at 585 nanometers. An example of a glass that may be used for a tungsten halogen lamp is BK7, a mixed alkali borosilicate glass also manufactured by Schott Glass Technologies, having 4.0 percent Neodymium Oxide doping and an extinction coefficient of $6.3^{-1}$ cm at 585 nanometers.

DESCRIPTION OF THE DRAWINGS

The invention can best be understood with reference to the following drawings in which.

DETAILED DESCRIPTION OF THE DRAWINGS

Figure 1:
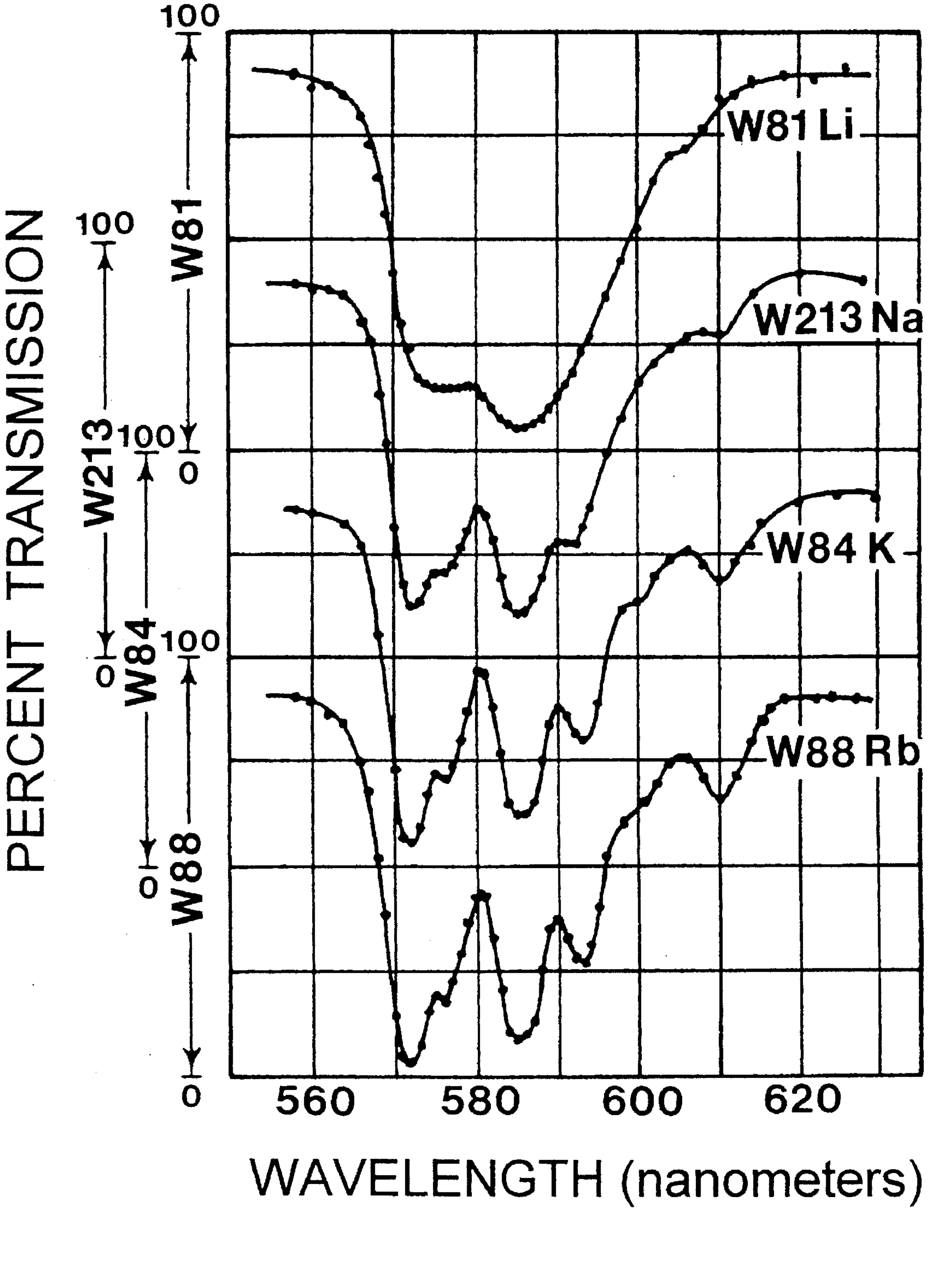
FIG. 1 is a graph comparing the transmittance of a number of Neodymium Oxide containing glasses.

FIG. 1 shows the transmission of various glasses containing Neodymium Oxide. It is shown that the smaller the atomic radium of the alkali the more diffuse is the absorption band. The fine structure of the rubidium glass gradually disappears when this large alkali is replaced by the smaller potassium, sodium, or lithium ion. The importance for the invention at hand of this graph is that regardless of the base type of the glass, the absorption of yellow light between 568 and 590 nanometers is seen in all samples of glass.

Figure 2:
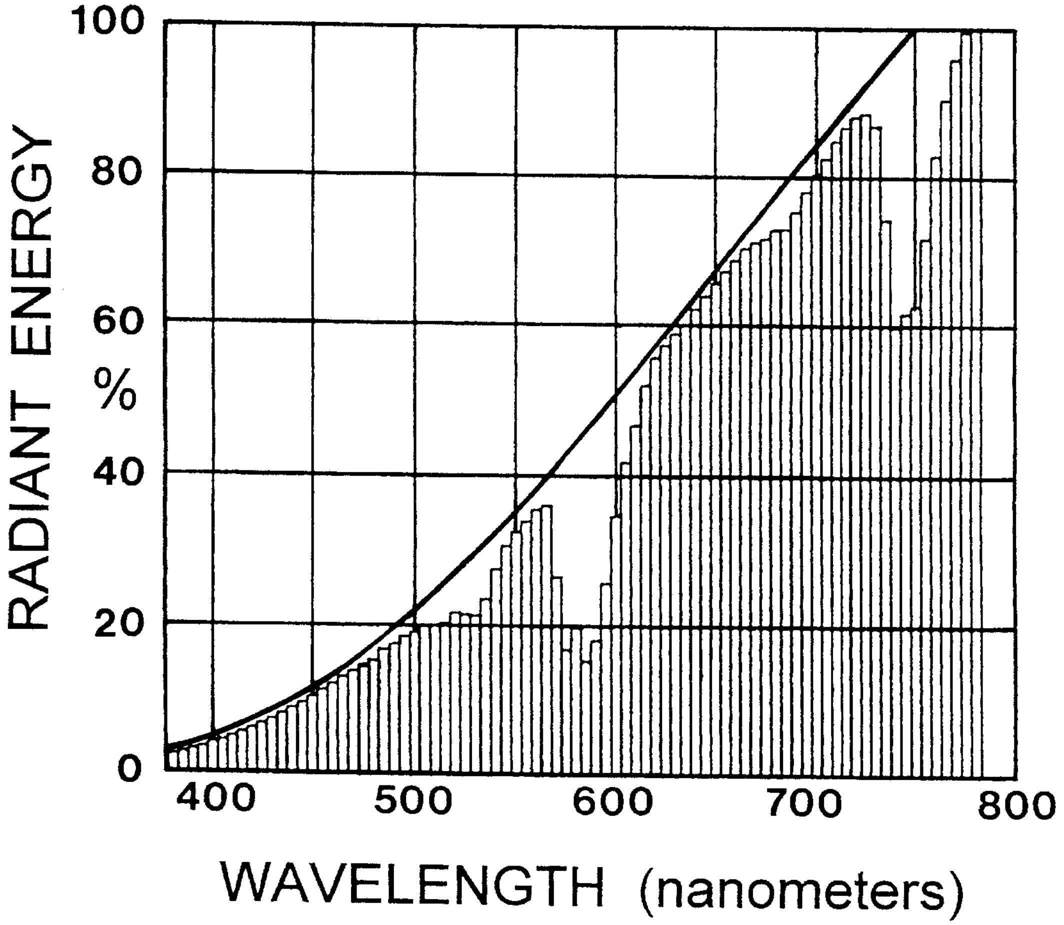
FIG. 2 is a graph showing the spectral energy distribution of a standard incandescent lamp and an incandescent lamp containing Neodymium Oxide in the glass bulb.

FIG. 2 compares the spectral energy distribution of a standard incandescent lamp (solid line) against a Neodymium Oxide containing glass when used to filter light from a standard incandescent lamp. It is seen that a notch is shown in the spectral energy distribution between 565 and 595 nanometers. Each bar in the graph is 5 nanometers wide. At the trough of the notch, the Neodymium Oxide is filtering out 68 percent of the yellow light.

Figure 3:
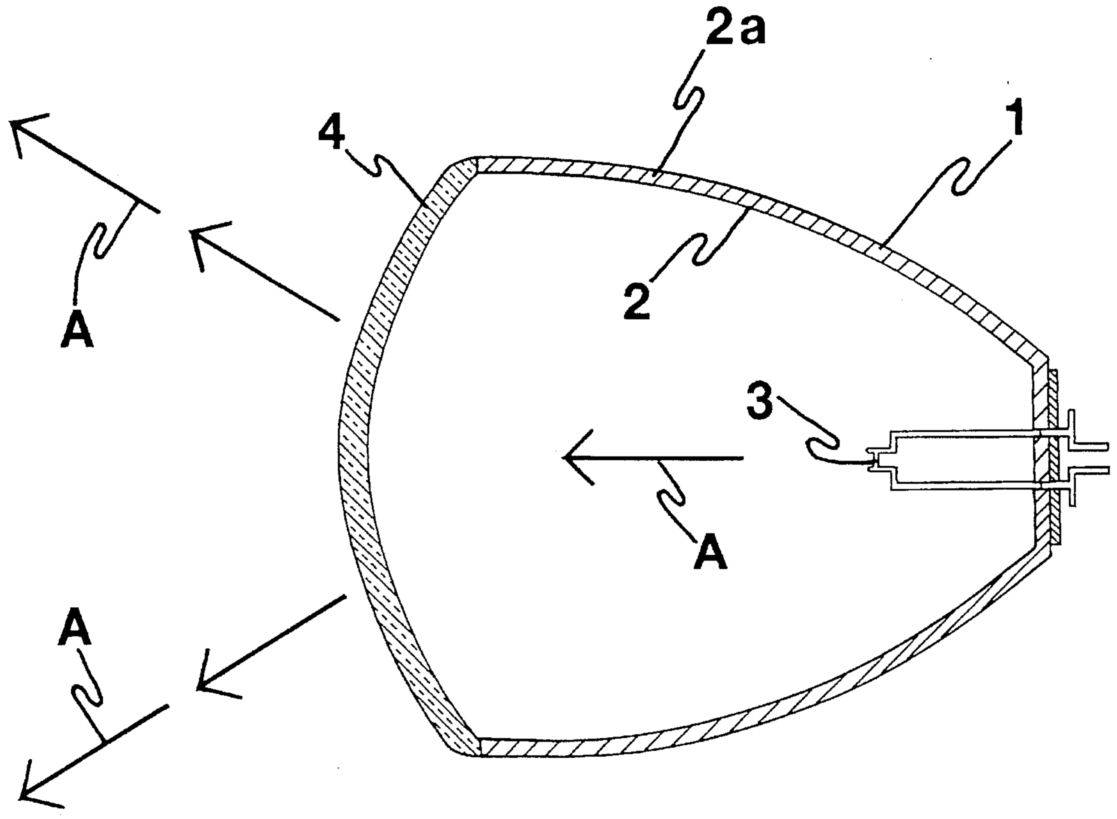
FIG. 3 is a side sectional view of an incandescent headlight of the present invention.

FIG. 3 shows a typical incandescent headlight with the entire bulb envelope containing Neodymium Oxide glass.

Figure 4:
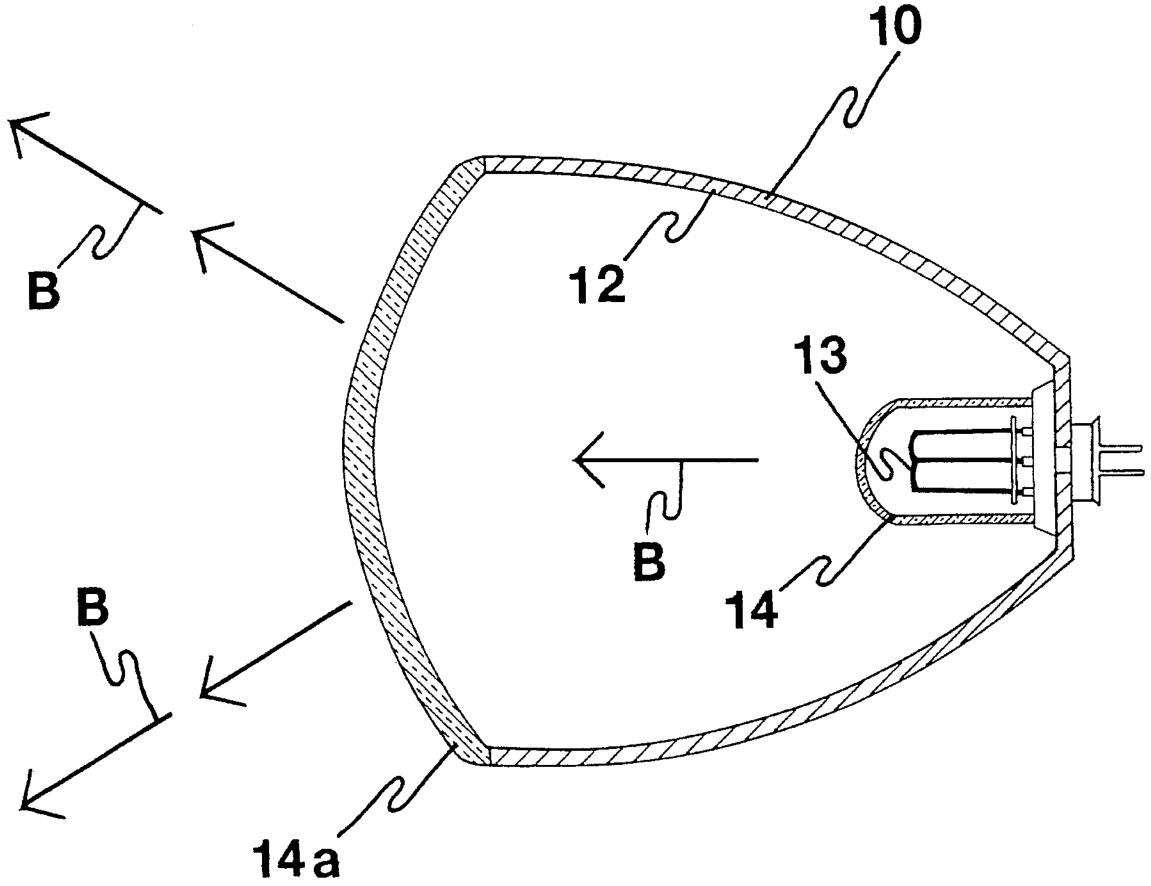
FIG. 4 is a side sectional view of a tungsten halogen headlight of the present invention.

FIG. 4 shows a typical tungsten halogen headlight with the inner lens envelope containing Neodymium Oxide glass.

DETAILED DESCRIPTION OF THE PREFERRED EMBODIMENT

The present invention constitutes a lamp for artificial illumination, including a means for illumination and has an envelope of a suitable glass material, containing the element Neodymium, wherein the Neodymium compound is Neodymium Oxide. The glass material contains Neodymium in the range of 5.0% to 30% by weight as calculated in terms of Neodymium Oxide, based upon the total weight of the glass material.

As shown in FIG. 3, a sealed beam incandescent headlight bulb envelope 1 has a generally concave inner reflector 2 integral with a generally convex transparent outer glass prism lens 4, which directs light from a hot incandescent filament 3 through the generally convex, transparent outer glass prism lens 4 in an outwardly expanding conical light beam A, which is transmitted from the vehicle headlight bulb envelope 1 and reflected off of objects at night and in bad weather, back to the automobile driver, with improved visual contrast from a reduction in the amount of yellow light, by the addition of Neodymium Oxide to the convex glass lens 4 and to the glass **2*a* with reflective surface 2 of the incandescent headlight bulb envelope 1**.

As shown in FIG. 4, a sealed beam tungsten halogen headlight 10 has a generally concave inner reflector 12 integral with a convex outer lens **14*a*, which directs light from a hot incandescent filament 13 through a generally convex, transparent inner glass lens 14 and outer envelope lens 14*a* in an outwardly expanding conical light beam B, which is likewise reflected from vehicle headlight 10 and off of objects at night and in bad weather, back to the driver, with improved visual contrast from a reduction in the amount of yellow light, also by the addition of Neodymium Oxide to the inner glass convex lens 14 of the tungsten headlight 10**. The light beam is reflected back to the driver with a unique spectral energy distribution, which promotes night vision and visual acuity in darkness, by emphasizing the contrast-producing red and green light waves, and at the same time, reducing the discomfort producing yellow light waves of the visible light spectrum of the concentrated light beam from motor vehicles from the opposite direction.

The outer and inner lens of the headlight lamps 1 and 10 includes the element Neodymium, in the form of Neodymium Oxide, in an effective amount for reducing discomfort from yellow light and promoting illumination, from a concentration of 5% to a concentration of about 30% within the lens glass. In the preferred embodiment for the Neodymium Oxide, it may also be selected in a concentration from about 5% to a concentration of about 15% in the glass of the headlight lens.

The Neodymium Oxide is employed in a vehicular headlight for a vehicle, such as an automobile, an aircraft, a water craft and other land traversing vehicles, such as all terrain vehicles or motorcycles.

In use, the lamp of the headlight of the present invention is for artificial illumination and has a spectral energy distribution signature bearing a reduction in yellow light, which is characterized as transmitted spectral energy in the wavelengths of light from about 565 nanometers to about 595 nanometers.

Preferably, the lamp constitutes a spectral energy distribution signature having a substantial reduction of up to 95% of the yellow light, namely light with transmitted spectral energy for wavelength from about 565 to about 595 nanometers as compared to transmitted spectral energy of a clear glass bulb not containing Neodymium Oxide.

The present invention is used to improve vision under conditions of artificial illumination, for providing artificial illumination in a spectral energy distribution signature having a reduction of up to 95% of yellow light, namely light with transmitted spectral energy for wavelengths from about 565 to about 595 nanometers, as compared to transmitted spectral energy of a clear glass bulb not containing Neodymium Oxide.

The present invention specifically includes the use of a headlight lamp for artificial illumination for a vehicle and it has a glass bulb envelope of a suitable material, such as a compound including the element Neodymium, wherein the Neodymium compound is Neodymium Oxide.

Specifically, to improve highway traffic safety at night in the absence of daylight, the present invention proposes improving vision under conditions of artificial illumination by providing automotive headlight illumination with a headlight lamp including glass having Neodymium Oxide, in a spectral energy distribution signature having a reduction of yellow light, such as light with about up to 95% of transmitted spectral energy for wavelengths from about 565 to about 595 nanometers, as compared to transmitted spectral energy of a clear glass bulb not containing Neodymium Oxide.

Modifications can be made to the method used for making the device, the device itself as well as the process described for the color corrected motor vehicle headlight without departing from the spirit and scope of the invention as exemplified in the appended claims.

I claim:

1. A vehicular headlight lamp for artificial illumination, comprising a filament generated light beam source, a generally concave inner reflector, an outer lens, said inner reflector being integral with said outer lens, said inner reflector and said lens comprising a bulb envelope for transmission of said filament generated light beam reflected off of said generally concave inner reflector through said outer lens of said bulb envelope, and a means for reducing the amount of transmitted yellow light in the range of 565 to 595 nanometers by up to 95% and promoting illumination, said means for reducing the amount of transmitted yellow light in the range of 565 to 595 nanometers and promoting illumination comprising said bulb envelope consisting of glass material containing Neodymium in the range of 5.0% –30% by weight as calculated in terms of Neodymium Oxide based upon the total weight of glass material.

2. The vehicle headlight lamp as in claim 1 wherein the lamp is a vehicular headlight lamp for an automobile.

3. The vehicle headlight lamp as in claim 1 wherein the lamp is a vehicular headlight lamp for a truck.

4. The vehicle headlight lamp as in claim 1 wherein the lamp is a vehicular headlight lamp for a bus.

5. The vehicle headlight lamp as in claim 1 wherein the lamp is a vehicular headlight lamp for a motorcycle.

6. The vehicle headlight lamp as in claim 1 wherein the lamp is a vehicular headlight lamp for all terrain vehicles.

7. A vehicular headlight lamp for artificial illumination, comprising a tungsten halogen generated light source, an inner glass bulb, a generally concave inner reflector, and an outer transparent lens envelope for transmission of said tungsten halogen generated light source reflected off of said generally concave inner reflector through said outer transparent lens envelope, and a means for reducing the amount of transmitted yellow light in the range of 565 to 595 nanometers by up to 95% and promoting illumination, said means for reducing the amount of transmitted yellow light in the range of 565 to 595 nanometers and promoting illumination comprising said inner glass bulb being suitable glass material including the element Neodymium in oxide form as Neodymium Oxide.

8. A vehicular headlight lamp as in claim 7 wherein said inner glass bulb comprises a glass envelope containing therein the compound Neodymium Oxide for reducing discomfort and promoting illumination from a concentration of about 5%, to a concentration of about 30 percent within said glass bulb envelope.

9. The vehicle headlight lamp as in claim 7 wherein the lamp is a vehicular headlight lamp for an automobile.

10. The vehicle headlight lamp as in claim 7 wherein the lamp is a vehicular headlight lamp for a truck.

11. The vehicle headlight lamp as in claim 7 wherein the lamp is a vehicular headlight lamp for a bus.

12. The vehicle headlight lamp as in claim 7 wherein the lamp is a vehicular headlight lamp for a motorcycle.

13. The vehicle headlight lamp as in claim 7 wherein the lamp is a vehicular headlight lamp for all terrain vehicles.

* * * * *